US011152795B2

United States Patent
Hallstrom et al.

(10) Patent No.: US 11,152,795 B2
(45) Date of Patent: Oct. 19, 2021

(54) SYSTEMS AND METHODS FOR FEDERATED POWER MANAGEMENT

(71) Applicant: FLORIDA ATLANTIC UNIVERSITY BOARD OF TRUSTEES, Boca Raton, FL (US)

(72) Inventors: Jason O. Hallstrom, Boca Raton, FL (US); Jiannan Zhai, Boca Raton, FL (US); Chancey Kelley, Boca Raton, FL (US); Michael Brown, San Antonio, TX (US); Alexander Roscoe, Sunrise, FL (US)

(73) Assignee: FLORIDA ATLANTIC UNIVERSITY BOARD OF TRUSTEES, Boca Raton, FL (US)

( * ) Notice: Subject to any disclaimer, the term of this patent is extended or adjusted under 35 U.S.C. 154(b) by 76 days.

(21) Appl. No.: 16/610,336

(22) PCT Filed: Mar. 28, 2018

(86) PCT No.: PCT/US2018/024933
§ 371 (c)(1),
(2) Date: Nov. 1, 2019

(87) PCT Pub. No.: WO2018/222261
PCT Pub. Date: Dec. 6, 2018

(65) Prior Publication Data
US 2020/0091737 A1    Mar. 19, 2020

Related U.S. Application Data

(60) Provisional application No. 62/513,762, filed on Jun. 1, 2017.

(51) Int. Cl.
*H02J 7/00* (2006.01)
*H02J 1/14* (2006.01)
(Continued)

(52) U.S. Cl.
CPC .............. *H02J 7/0013* (2013.01); *H02J 1/14* (2013.01); *H02J 7/0021* (2013.01);
(Continued)

(58) Field of Classification Search
CPC ......... H02J 7/0013–0025; H02J 7/0048; H02J 7/345
See application file for complete search history.

(56) References Cited

U.S. PATENT DOCUMENTS 5,539,297 A * 7/1996 Fiebig ................... H02J 7/0024
320/126
2005/0001593 A1* 1/2005 Kawasumi ............ H02J 7/0025
320/132

(Continued)

OTHER PUBLICATIONS

Josiah Hester, Lanny Sitanayah, and Jacob Sorber, "Demo: A Hardware Platform for Separating Energy Concerns in Tiny, Intermittently-Powered Sensors", Nov. 1, 2015, 3th ACM Conference on Embedded Networked Sensor Systems (SenSys '15) (Year: 2015).*

(Continued)

*Primary Examiner* — Hal Kaplan
*Assistant Examiner* — David A Shiao
(74) *Attorney, Agent, or Firm* — Fox Rothschild LLP

(57) ABSTRACT

Systems and methods for providing federated power management in an electronic circuit. The methods comprise: performing first operations by a processing device to obtain information indicating a current level of charge for each of a plurality of capacitors which have been supplied energy from a power source; transforming, by the processing device, each capacitor's current level of charge into a number of service units for a respective electronic load device of a plurality of electronic load devices; determining, by the processing device, at least one of recharging priorities for the plurality of capacitors and discharging priorities for the plurality of capacitors at least based on the results of said (Continued)

transforming; and performing second operations by the processing device to cause the plurality of capacitors to be recharged in accordance with the recharging priorities or discharged in accordance with the discharging priorities.

16 Claims, 10 Drawing Sheets

(51) Int. Cl.
*A01G 25/16* (2006.01)
*H02J 7/34* (2006.01)

(52) U.S. Cl.
CPC .......... *H02J 7/0048* (2020.01); *H02J 7/0068* (2013.01); *A01G 25/16* (2013.01); *H02J 7/345* (2013.01)

(56) References Cited

U.S. PATENT DOCUMENTS

| | | | |
|---|---|---|---|
| 2005/0213267 A1 | 9/2005 | Azrai et al. | |
| 2006/0244427 A1 | 11/2006 | Thrap | |
| 2007/0182362 A1 | 8/2007 | Trainor et al. | |
| 2008/0094042 A1 | 4/2008 | Ferrario | |
| 2009/0167217 A1 | 7/2009 | Soma et al. | |
| 2010/0090663 A1* | 4/2010 | Pappas | H01G 9/155 320/166 |
| 2012/0105043 A1 | 5/2012 | Wilson | |
| 2013/0314101 A1 | 11/2013 | Belet | |
| 2014/0009119 A1* | 1/2014 | Ibe | H02J 7/0047 320/134 |
| 2014/0359338 A1 | 12/2014 | Park | |
| 2015/0008872 A1* | 1/2015 | Fujimori | H02J 7/345 320/107 |
| 2015/0042290 A1* | 2/2015 | Zhou | H02J 7/00 320/137 |
| 2015/0207355 A1* | 7/2015 | Taylor | H02J 7/0063 320/136 |
| 2016/0126761 A1* | 5/2016 | Sanford | G06F 1/263 320/134 |
| 2016/0226268 A1* | 8/2016 | Okui | H02J 7/0071 |
| 2016/0380312 A1* | 12/2016 | Hellmann | H01M 10/441 318/139 |
| 2018/0043785 A1* | 2/2018 | Takatsuka | H02J 7/027 |
| 2018/0123362 A1* | 5/2018 | Zheng | H02J 7/0021 |
| 2018/0145518 A1* | 5/2018 | Onizuka | H02J 7/0068 |

OTHER PUBLICATIONS

Josiah Hester and Jacob Sorber, "Flicker: Rapid Prototyping for the Batteryless Internet-of-Things", Nov. 6, 2017, 15th ACM Conference on Embedded Network Sensor Systems (SenSys '17) (Year: 2017).*

International Search Report dated Jun. 22, 2018 in PCT/US2018/024933.

Audet et al. "recurring tasks in energy harvesting sensors" In Computer Communications Workshops (INFOCOM WKSHPS), 2011 IEEE Conference on, pp. 277-282.

Eidson et al. "The South Carolina Digital Watershed: End-to-end support for realtime management of water resources", International Journal of Distributed Sensor Networks, pp. 8pp.

Gummeson et al. "On the limits of effective hybrid mircoenergy harvesting on mobile cr d sensors", In Proceedings of the 8th international conference on Mobile systems, applications, and services, pp. 195-208.

Hester et al., Tragedy of the coulombs: Federating energy storage for tiny, intermittently-powered sensors. In Proceedings of the 13th ACM Conference on Embedded Networked Sensor Systems, SenSys' 15, pp. 5-16.

Jiang et al., Fast, accurate event classification on resource-lean embedded sensors. ACM Transactions on Autonomous and Adaptive Systems, 2013.

Jiang et al., "Fast distributed simulation of sensor networks using optimistic synchronization", In the 7th IEEE International Conference on Distributed Computing in Sensor Systems, pp. 1-8, Jun. 2011.

Jiang et al., "Perpetual environmentally powered sensor networks", In Information Processing in Sensor Networks, Fourth International Symposium, 2005, pp. 463-468.

Kansai et al., "Power management in energy harvesting sensor networks", ACM Transactions on Embedded Computing Systems (TECS), 6(4):32, 2007.

Moser et al., "Real-time scheduling for energy harvesting sensor nodes", Real-Time Systems, 37(3), 233-260, 2007.

Mudigonda et al., "A mobility management framework for optimizing the trajectory of a mobile base-station", In the 8th European Conference on Wireless Sensor Networks, Feb. 2011.

Sorber et al., "A language and runtime system for perpetual systems", In the 5th International Conference on Embedded Networked Sensor Systems, pp. 161-174, Nov. 2007.

"Fix a Leak Week", United States Environmental Protection Agency, <https://www3.epa.gov/watersense/pubs/>xleak.html, May 2016. (date of last access).

"Outdoor Water Use in the United States", United States Environmental Protection Agency, <https://www3.epa.gov/watersense/pubs/outdoor.html>, May 2016. (date of last access).

Wahba et al., "Initiating a design pattern catalog for embedded network systems", In the 10th International Conference on Embedded Software, pp. 249-258, Oct. 2010.

* cited by examiner

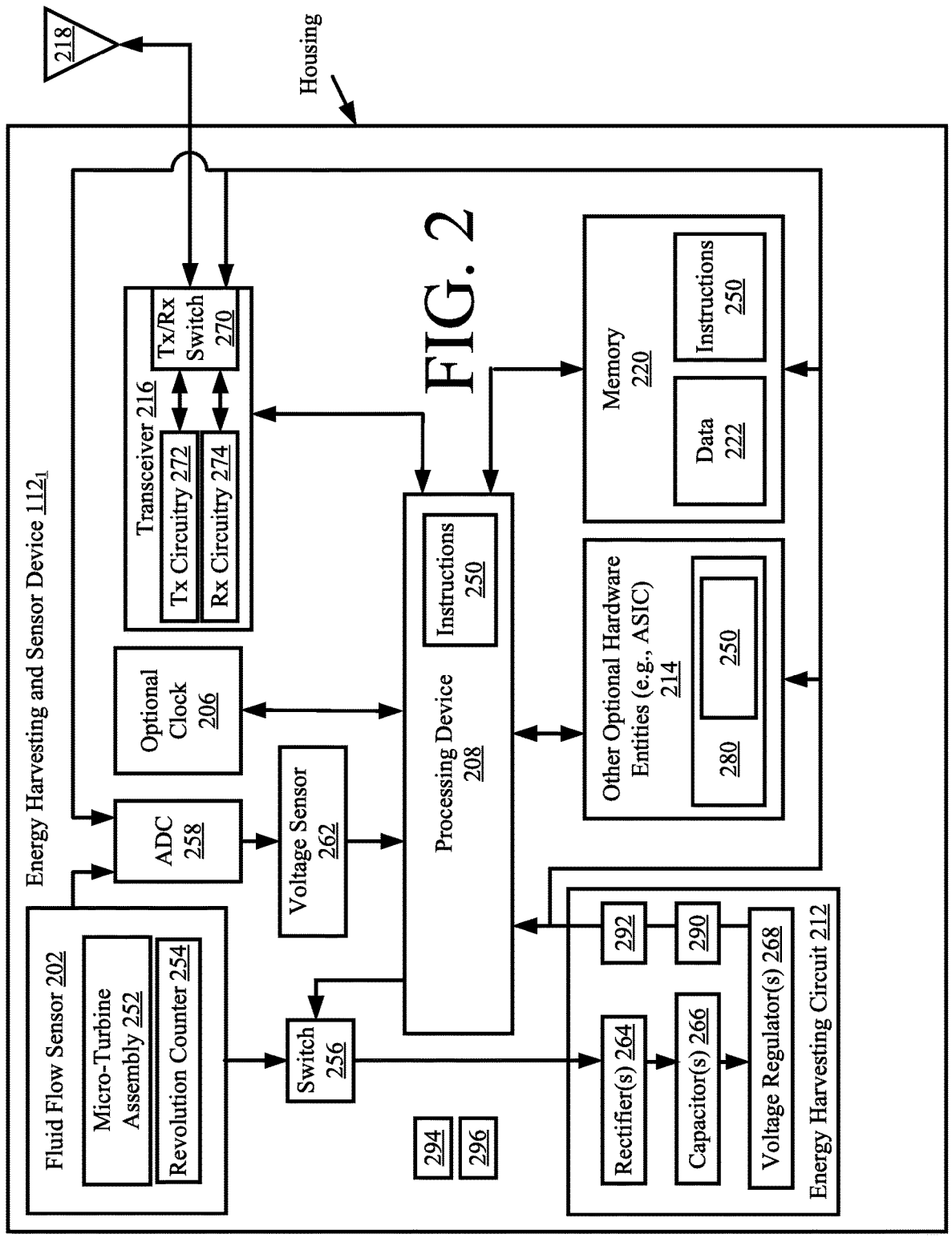

Go To FIG. 8B

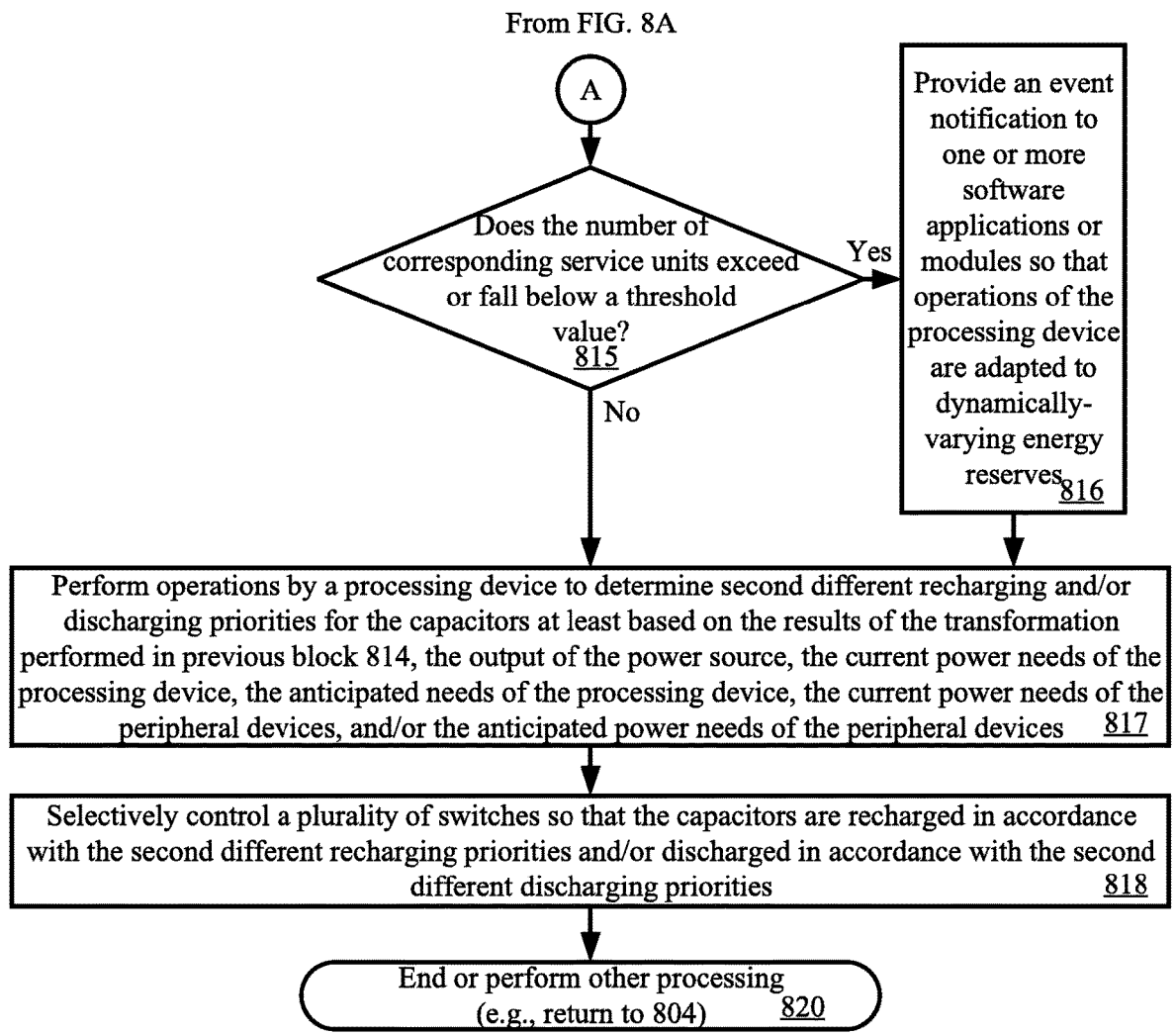

SYSTEMS AND METHODS FOR FEDERATED POWER MANAGEMENT

CROSS REFERENCE TO RELATED APPLICATIONS

This application is a National Phase Entry of PCT/US2018/024933 filed on Mar. 28, 2018, entitled "SYSTEMS AND METHODS FOR FEDERATED POWER MANAGEMENT ", which claims priority to U.S. Provisional Patent Application No. 62/513,762 filed on Jun. 1, 2017, both of which are incorporated herein by reference in their entireties.

STATEMENT REGARDING FEDERAL FUNDING

The invention was made with government support under contract number CNS 1644789 awarded by the National Science Foundation. The government has certain rights in the invention.

FIELD

This document relates generally to electronic circuits. More particularly, this document relates to systems and methods for federated power management.

BACKGROUND

Power management is often employed in electronic circuits for controlling the amount of electrical power consumed by electronic elements thereof (e.g., processors, sensors, etc.), with minimal impact on performance. The electronic elements often have different power usage characteristics. This electrical power control can be achieved by selectively transitioning the electronic elements into and out of different operational modes, and/or simply by selectively adjusting an amount of power supplied to the electronic elements.

SUMMARY

The present disclosure concerns systems and methods for providing federated power management in an electronic circuit. The methods comprise performing first operations by a processing device to obtain information indicating a current level of charge for each of a plurality of capacitors which have been supplied energy from a power source. The information can comprise values specifying sensed voltage levels across plates of the plurality of capacitors.

The processing device transforms each capacitor's current level of charge (or sensed voltage level) into a number of service units for a respective electronic load device of a plurality of electronic load devices (e.g., a transceiver, a memory, and/or a sensor). In some scenarios, this transformation comprises mapping each capacitor's current level of charge into a number of service activations for each type of operation that can be performed by the respective electronic device. The number of service units comprises a number of available transmissions, an amount of available time that can be spent in a reception state, a number of memory reads, a number of memory writes, or a number of measurements that can be taken by a sensing device, as examples. The results of the transformation are then used by the processing device to determine at least one of recharging priorities for the plurality of capacitors and discharging priorities for the plurality of capacitors.

The processing device performs second operations to cause the plurality of capacitors to be recharged in accordance with the recharging priorities and/or discharged in accordance with the discharging priorities. In some scenarios, the second operations comprise selectively controlling a plurality of switches respectively connected between the power source and the plurality of capacitors. The power source may include an Energy Harvesting Circuit ("EHC"). Voltage regulators may reside respectively between the plurality of switches and the plurality of capacitors. The second operations additionally or alternatively comprise: selectively controlling a plurality of switches respectively connected between the plurality of capacitors and the plurality of electronic load devices; selectively controlling a plurality of switches respectively connected between at least two capacitors of the plurality of capacitors.

DESCRIPTION OF THE DRAWINGS

The present solution will be described with reference to the following drawing figures, in which like numerals represent like items throughout the figure.

FIG. 2 provides an illustration of an illustrative architecture for the Energy Harvesting and Sensor Device(s) ("EHSD(s)") shown in FIG. 1.

FIGS. 8A-8B (collectively referred to herein as "FIG. 8") provide a flow diagram of an illustrative method for providing federated power management.

DETAILED DESCRIPTION

Figure 1A:
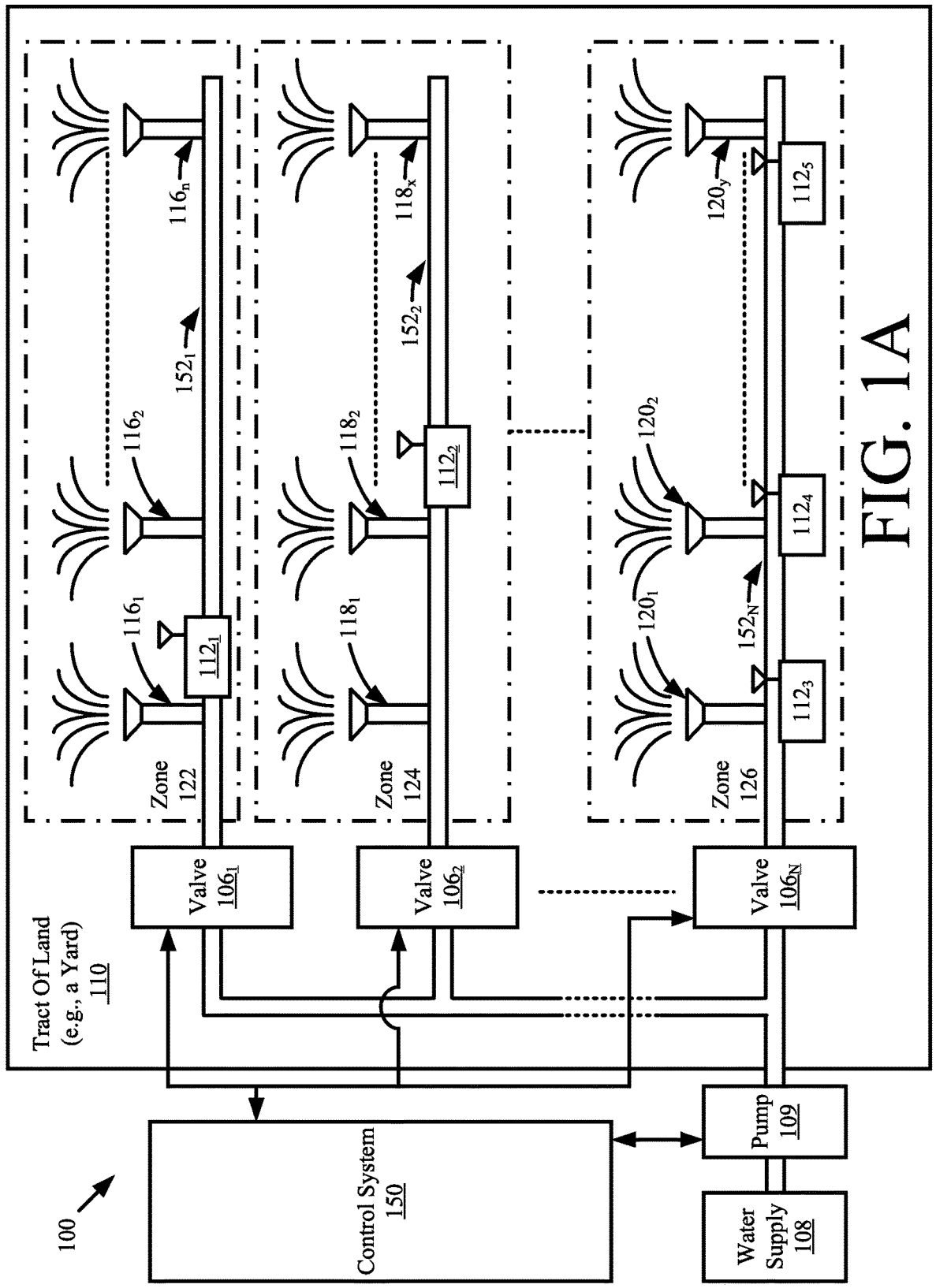
FIGS. 1A-1B (collectively referred to as "FIG. 1") provide an illustration of an illustrative irrigation or sprinkler system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution will be described herein in relation to irrigation systems. The present solution is not limited in this regard. In this regard, it should be understood that the present solution generally comprises a power management circuit for controlling the amount of electrical power consumed by electronic elements thereof (e.g., processors, sensors, etc.), with minimal impact on performance. Accordingly, the present solution can be used with any electronic circuit in any given application in which a power management scheme is needed. For example, the present solution can be used in a low power energy harvesting circuit for environmental monitoring (e.g., for $CO_2$ sensing applications).

In the irrigation system scenarios, implementing systems and methods are provided for detecting leaks, either above ground or below ground, in residential and commercial irrigation systems. The system can be subdivided into an enabling device and a supporting algorithm. The enabling device comprises a battery-free wireless sensing platform intended for in-line installation. The enabling device simultaneously harvests energy from in-pipe fluid flows, and wirelessly reports data measurements of the fluid flows. The dual harvesting and measurement design is novel. It includes a new approach to achieving sensing accuracy, and a novel antenna mechanism. The supporting algorithm facilitates the detection of fluid flow anomalies across a multi-point monitoring field based on data collected from the sensing device. The resulting system comprises a field of sensing devices, a receiving station, and the supporting algorithm.

The present solution concerns systems and methods for federated power management. The federated power management can be employed in a fluid supply system such as the above described irrigation or sprinkler system and/or any other system in which power management is needed. The manner in which the federated power management is achieved will become evident as the discussion progresses.

The present solution is described herein in terms of irrigation and sprinkler system applications in a plurality of venues. The venues include, but are not limited to, golf course applications, sports field applications, residential applications, park applications, farm applications, nursery applications, military applications, cemetery applications, city municipality applications, and/or theme park applications. The present solution is not limited in this regard. The present solution can be employed in any application in which leaks need to be detected in a pipeline and/or power needs to be managed, and/or power needs to be managed. Accordingly, the present solution can be used in a variety of fluid supply system applications and/or electronic circuit applications. Such fluid supply system applications include scientific applications and/or chemical processing applications. Such electronic circuit applications include energy harvesting applications and power supply applications.

Illustrative Irrigation System

Referring now to FIG. 1A, there is provided a schematic illustration of an illustrative architecture for an irrigation system 100. The irrigation system 100 is generally configured to facilitate the monitoring of fluid flow (e.g., water flow) through the irrigation system while irrigating a tract of land (e.g., a yard) 110. As such, the irrigation system 100 comprises a water supply 108, a pump 109, a control system 150, at least one valve $106_1, 106_2, \ldots, 106_N$, a plurality of sprinklers $116_1, 116_2, \ldots, 116_n, 118_1, 118_2, \ldots, 118_x, 120_1, 120_2, \ldots, 120_y$, and at least one EHSD $112_1, 112_2, \ldots, 112_S$.

Figure 1B:
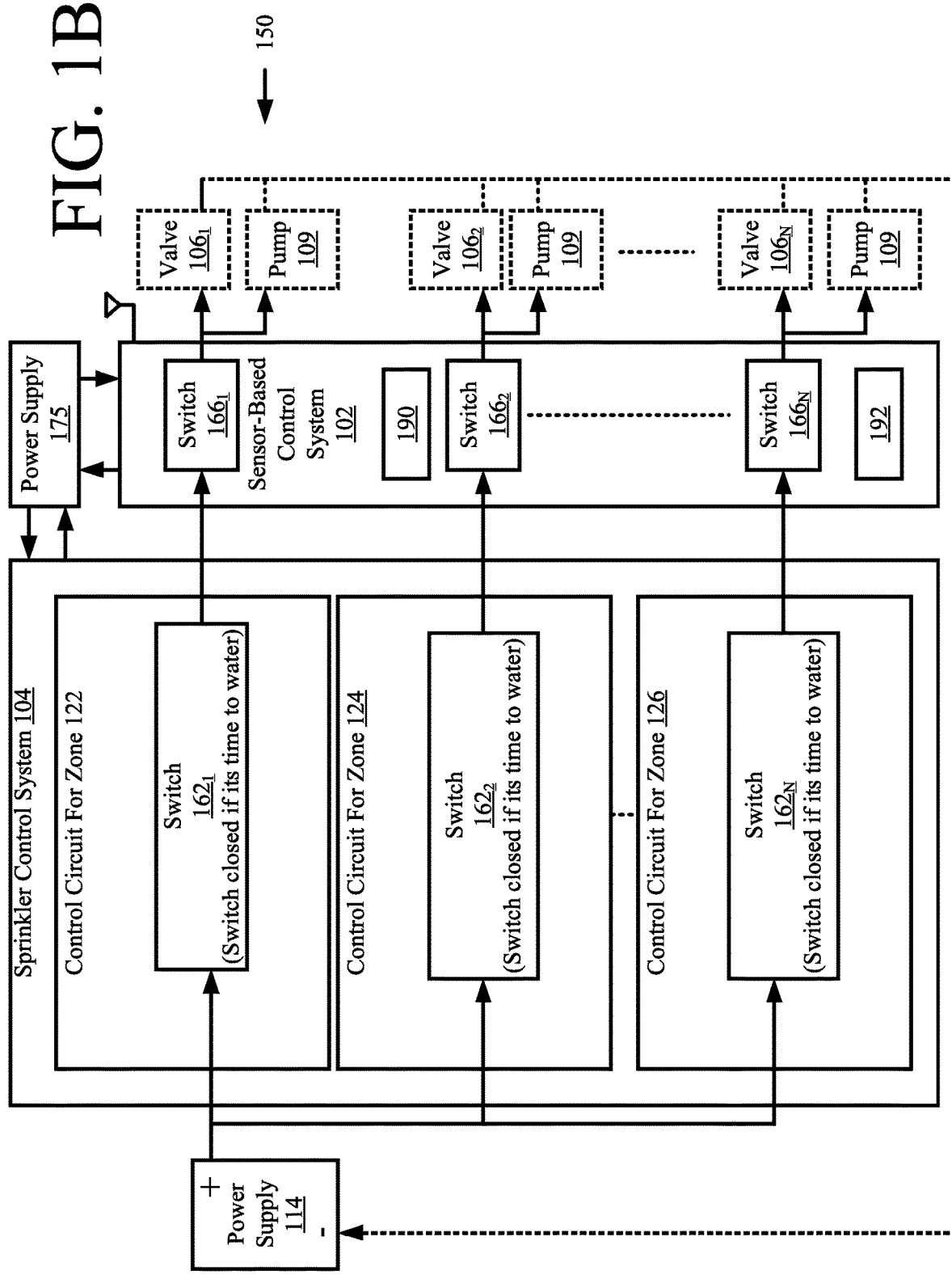

The control system 150 is generally configured to control the operation of the irrigation system 100. A detailed block diagram of an illustrative architecture of the control system 150 is provided in FIG. 1B. As shown in FIG. 1B, the control system 150 includes one or more power supplies 114, 175, a Sprinkler Control System (SCS) 104 and a Sensor-Based Control System (SBCS) 102. SCS 104 and SBCS 102 are shown in FIG. 1 comprising two separate components. The present solution is not limited in this regard. Alternatively, these components 102, 104 can comprise a single component.

The SCS 104 is generally configured to control the operations of the sprinkler system 100. The SCS 104 includes any single zone or multi-zone sprinkler control system that is known or to be known in the art. For example, the SCS 104 includes, but is not limited to, a sprinkler timer having a model number 57896 or 94881 which is available from Orbit Irrigation Products, Inc. of Bountiful, Utah.

As shown in FIG. 1B, the SCS 104 comprises a plurality of switches $162_1, 162_2, \ldots, 162_N$ coupled to a terminal of the power supply 114. Each switch is allocated to control operations of a particular zone 122, 124, 126 of the irrigation system 100. For example, switch $162_1$ comprises a control circuit for zone 122 of the irrigation system 100. Switch $162_2$ comprises a control circuit for zone 124 of the irrigation system 100. Switch $162_N$ comprises a control circuit for zone 126 of the irrigation system 100. Each of the switches $162_1, 162_2, \ldots, 162_N$ is normally in an open position. As such, each switch $162_1, 162_2, \ldots, 162_N$ is transitioned to a closed position when the SCS 104 determines that it is time to water all or a portion of a tract of land (e.g., a yard).

The SBCS 102 is configured to enable and disable normal operations of the irrigation system 100. In this regard, the SBCS 102 is disposed between the switches $162_1, 162_2, \ldots, 162_N$ of the SCS 104 and the valves $106_1,$ $106_2, \ldots, 106_N$ and/or pump 109. As shown in FIG. 1B, the SBCS 102 includes a plurality of switches $166_1$, $166_2, \ldots, 166_N$ for controlling when the switches $162_1$, $162_2, \ldots, 162_N$ of the SCS 104 are electronically connected to the valves $106_1, 106_2, \ldots, 106_N$ and/or pump 109.

When the switches $166_1, 166_2, \ldots, 166_N$ of the SBCS 102 are closed, normal operations of the irrigation system are enabled. In this scenario, power can be supplied from the power supply 114 to the valves $106_1, 106_2, \ldots, 106_N$ and/or pump 109. Each of the valves $106_1, 106_2, \ldots, 106_N$ includes, but is not limited to, an electromechanical valve (e.g., a solenoid valve). Each of the valves $106_1$, $106_2, \ldots, 106_N$ is normally in a closed position. Therefore, each valve $106_1, 106_2, \ldots, 106_N$ transitions to an open position in response to a signal received from the SCS 104. In this scenario, water is allowed to flow from the water supply 108 to the sprinklers $116_1, 116_2, \ldots, 116_n, 118_1$, $118_2, \ldots, 118_x, 120_1, 120_2, \ldots, 120_y$ of the respective zone(s) 122, 124, 126.

The SBCS 102 determines when to enable and disable normal operations of the irrigation system 100 based on sensor information received from the EHSDs $112_1$, $112_2, \ldots, 112_5$. The sensor information includes, but is not limited to, measures of fluid flow, measures of turbine rotation, and/or information indicating that leak(s) has(have) been detected in one or more zones 122, 124, 126. The leak/flow information could also be presented to a homeowner, property manager and/or upper-tier system.

In FIG. 1A, the EHSDs $112_1, 112_2, \ldots, 112_5$ are disposed at least partially in the soil of one or more zones 122, 124, 126 of the tract of land 110. The depth at which the EHSDs $112_1, 112_2, \ldots, 112_5$ are buried in the soil depends on the particular application, as well as the transmitter technology implemented therein. For example, if an EHSD $112_1$, $112_2, \ldots, 112_5$ implements a sub-gigahertz wireless communication technology, then the entire EHSD, except for an antenna, is buried in the ground.

As shown in FIG. 1A, EHSD $112_1$ is disposed in zone 122. EHSD $112_2$ is disposed in zone 124. EHSDs $112_3, 112_4$, $112_5$ are disposed in zone 126. The present solution is not limited to this particular arrangement of EHSDs. The EHSDs $112_1, 112_2, \ldots, 112_5$ can be disposed at locations within the tract of land 110 that are selected in accordance with any particular application. In this regard, one or more EHSDs $112_1, 112_2, \ldots, 112_5$ can be disposed in each zone 122, 124, 126. Alternatively, at least one of the zones 122, 124, 126 can be absent of an EHSD.

Each EHSD $112_1, 112_2, \ldots, 112_5$ is disposed adjacent to or in proximity with a respective sprinkler $116_1, 116_2, \ldots,$ $116_n, 118_1, 118_2, \ldots, 118_x, 120_1, 120_2, \ldots, 120_y$. An EHSD need not be disposed at each sprinkler location along a given pipeline $152_1, 152_2, \ldots, 152_n$. As such, each pipeline can have zero, one or more EHSDs disposed therealong. For example, pipeline $152_1$ has one EHSD $112_1$ disposed thereon. Pipeline $152_2$ has one EHSD $112_2$ disposed thereon. Pipeline $152_N$ has a plurality of EHSDs $112_3$-$112_5$ disposed therealong. The present solution is not limited to the particulars of this example.

Each EHSD can be disposed before, under, or after the respective sprinkler along the pipeline, as shown in FIG. 1A. In some scenarios, the antenna of the EHSD is incorporated into the sprinkler. Such a configuration facilitates an added benefit of being able to detect when a sprinkler is broken or damaged. For example, if an EHSDs antenna is integrated with a sprinkler, then a determination can be made that the sprinkler is damaged when the antenna is unable to transmit signals therefrom (i.e., a remote communications device no longer receives signals from the EHSD). The present solution is not limited to the particulars of this example.

The EHSDs $112_1, 112_2, \ldots, 112_5$ will be described in detail below in relation to FIG. 2. However, it should be understood that the EHSDs $112_1, 112_2, \ldots, 112_5$ are generally configured to measure a natural fluid flow through the respective pipelines $152_1, 152_2, \ldots, 152_n$. After measuring the natural fluid flow, an EHSD $112_1, 112_2, \ldots$ , $112_5$ can perform certain operations. These operations can include, but are not limited to, the following operations: temporarily storing data representing the measured natural fluid flow; and transmitting the data to the SBCS 102 or other remote computing device (e.g., a server). The data is stored in the EHSD $112_1, 112_2, \ldots, 112_5$ in accordance with any particular format, such as a table format. In some scenarios, the EHSD $112_1, 112_2, \ldots, 112_5$ also transmits an identifier and/or timestamp to the SBCS 102 or other remote computing device (e.g., a server). The identifier includes a sequence of number, letters and/or symbols that is unique to the EHSD $112_1, 112_2, \ldots, 112_5$. In this scenario, the SBCS 102 may use the identifier to determine in which zone 122, 124, 126 the EHSD $112_1, 112_2, \ldots, 112_5$ is located. Based on such a determination, the SBCS 102 may disable operations of that zone when a leak is detected. Still, the present solution is not limited in this regard.

At the SBCS 102, the data is recorded and processed. The data can be recorded in a memory 192 of the SBCS 102. In some scenarios, the data can additionally or alternatively be stored in a memory of an external device (not shown). The external device includes, but is not limited to, a computing device and a remote database. The computing device includes, but is not limited to, a general purpose computer, a personal digital assistant, a cellular phone and a smart phone. In either scenario, the data is stored in accordance with a particular format. For example, the fluid flow data is stored in a table format so as to be associated with a time stamp and/or an identifier of an EHSD. The time stamp can represent a time when the data is received by the SBCS 102 or a time when a natural fluid flow is measured by the EHSD. The present solution is not limited in this regard.

Notably, the stored data can be accessed by a user at some future time for purposes of viewing and analyzing the same. In this regard, the SBCS 102 and/or external device (not shown) may restrict access to the stored information based on a user identifier, a password, at least one static biometric feature and/or access rights of the user or other user-authorized person. In some scenarios, the access restriction is achieved using an authentication technique. Authentication techniques are well known to those skilled in the art, and therefore will not be described herein.

Once a user has been authenticated, the SBCS 102 and/or external device (not shown) will retrieve all or a portion of the stored information from a respective memory (not shown). The retrieved information can be processed by the SBCS 102 and/or external device (not shown) for displaying one or more tables, graphs, statistical displays, preset parameter values and other information to the user. The other information can include, but is not limited to, recommendations for sprinkler replacement or pipeline repair. The information can be displayed to the user via a display screen of the SBCS 102 and/or external device (not shown). The tables, graphs and/or statistical displays can be stored in the memory of the SBCS 102 and/or external device (not shown). Alternatively, the tables, graphs and/or statistical displays can be discarded after the user has finished viewing the same.

Referring now to FIG. 2, there is provided a detailed block diagram of the EHSD $112_1$. The EHSDs $112_2$, $112_3$, ..., $112_5$ of FIG. 1A are the same as or substantially similar to the EHSD $112_1$. As such, the following discussion of EHSD $112_1$ is sufficient for understanding the EHSDs $112_2$, $112_3$, ..., $112_5$. Notably, the EHSD $112_1$ may include more or less components than those shown in FIG. 2. However, the components shown are sufficient to disclose an illustrative implementation of the present solution.

The hardware architecture of FIG. 2 represents one embodiment of a representative EHSD $112_1$ configured to facilitate the monitoring of fluid flow in a pipeline and/or the management of power. As such, the EHSD $112_1$ implements at least a portion of (a) a method for controlling an irrigation system in accordance with the present solution and/or (b) a method for providing federated power management. Illustrative methods for controlling an irrigation system will be described below in relation to FIG. 3. Illustrative methods for providing federated power management will be described below in relation to FIG. 8.

The EHSD $112_1$ provides a transiently-powered wireless sensing device that simultaneously monitors and harvests energy from the flow of fluid (e.g., water) through a pipeline. The EHSD $112_1$ automates the detection of underground leaks, which increase irrigation costs, waste freshwater resources, and contribute to soil and structural stability.

As shown in FIG. 2, the EHSD $112_1$ includes an antenna 218 for receiving and transmitting signals. The antenna 218 can include, but is not limited to, a whip antenna, a wire antenna, or a ceramic chip antenna. The antenna 218 can be integrated in a sprinkler. In this case, the antenna 218 may be at least partially disposed in the main body and/or head of the sprinkler, and/or at least partially printed or deposited on an interior surface of the sprinkler using a conductive ink or other material (e.g., copper).

The antenna 218 is coupled to a transceiver 216. Transceivers are well known in the art, and therefore will not be described in detail herein. Any known or to be known transceiver can be used herein without limitation.

In some scenarios, the transceiver 216 includes, but is not limited to, a sub-gigahertz transceiver. The transceiver 216 comprises a receive/transmit (Rx/Tx) switch 270, transmitter (Tx) circuitry 272 and receiver (Rx) circuitry 274. The Rx/Tx switch 270 selectively couples the antenna 218 to the Tx circuitry 272 and Rx circuitry 274 in a manner familiar to those skilled in the art.

The Rx circuitry 274 decodes the signals received from an SBCS (e.g., the SBCS 102 of FIG. 1) to derive information therefrom. The Rx circuitry 274 provides decoded signal information to a processing device 208. The processing device 208 uses the decoded RF signal information in accordance with the function(s) of the EHSD $112_1$.

The processing device 208 also provides information to the Tx circuitry 272 for encoding information and/or modulating information into transmit signals. Accordingly, the processing device 208 is coupled to the Tx circuitry 272. The Tx circuitry 272 communicates the transmit signals to the antenna 218 for transmission to an external device (e.g., the SBCS 102 of FIG. 1).

As shown in FIG. 2, the EHSD $112_1$ further includes a fluid flow sensor 202, a switch 256, an Analog-to-Digital Converter ("ADC") 258, a voltage sensor 262, an optional clock 206, an Energy Harvesting Circuit ("EHC") 212, a processing device 208, a memory 220 and other optional hardware entities 214. The fluid flow sensor 202 is generally configured to detect an amount of fluid flow through a pipeline (e.g., pipeline $152_1$ of FIG. 1). The fluid flow may be measured in the unit of cubic feet per hour. The fluid flow is measured using a micro-turbine assembly 252 and a revolution counter 254. Micro-turbine assemblies are well known in the art, and therefore will not be described in detail herein. Any known or to be known micro-turbine assembly can be used herein without limitation.

The revolution counter is generally configured to count the number of turns made by the micro-turbine. In some scenarios, the revolution counter includes, but is not limited to, a dipole magnet disposed on a spindle of the micro-turbine assembly and a magnetic decoder installed on the top of a generator of the micro-turbine assembly. The revolution counter counts the number of turns made by the micro-turbine as a result of fluid passing therethrough. The number of turns indicates the amount of fluid flow at a given location along a pipeline.

In some scenarios, the amount of fluid flow is additionally or alternatively determined using the ADC 258 and voltage sensor 262. The Alternating Current ("AC") output of the micro-turbine 252 is fed to the ADC 258. The ADC 258 converts the AC output into a DC output. The DC output is then fed to the voltage sensor 262.

Voltage sensors are well known in the art, and therefore will not be described in detail herein. Any known or to be known voltage sensor can be used herein without limitation. In some scenarios, the voltage sensor 262 measures the voltage level of the DC output. The measured voltage level indicates the amount of fluid flow at a given location along a pipeline. In other scenarios, revolutions can be used to measure fluid flow, for example, by observing voltage spikes. The measured voltage level is then communicated to the processing device 208 and/or memory 220 for storage therein.

The micro-turbine's AC output is also used by the EHC 212. The EHC 212 comprises rectifier(s) 264, a capacitor array 266, and voltage regulator(s) 268. Notably, in some scenarios, components 266 and 268 are replicated for each peripheral device 202, 258, 216, 220, 214 with switching of charge and discharge controlled by the processing device 208. The AC output of the micro-turbine 252 is fed to the rectifier 264. Rectifiers are well known in the art, and therefore will not be described in detail herein. Still, it should be understood that the rectifier 264 converts alternating current into direct current by allowing a current to flow through it in one direction only. The rectifier includes any known or to be known rectifier, such as a full wave rectifier or a half wave rectifier. The rectifier can be implemented using transistors and/or diodes as is known in the art.

The rectifier's output is passed to the capacitors 266. The capacitors reduce voltage ripple, and supply a voltage to the voltage regulator 268. The voltage regulator 268 maintains a constant output voltage level. The constant output voltage of the voltage regulator 268 supplies energy to a super-capacitor array 290 for storage therein. Notably, each peripheral has its own capacitor or capacitor array. The super-capacitor array 290 supplies power to at least components 208, 214, 216, 220, 258 of the EHSD $112_1$ via one or more voltage down converters 292. Voltage down converters are well known in the art, and therefore will not be described in detail herein. Any known or to be known voltage converter can be used herein without limitation. Notably, in some scenario, the super-capacitor array 290 can reside before voltage regulator 268.

The switch 256 is provided for selectively connecting and disconnecting the fluid flow sensor 202 from the EHC 212. The switch includes any known or to be known mechanical switch, electrical switch, or electromechanical switch that is able to open and close and electrical connection. During operation, it may be desirable to disconnect the fluid flow sensor 202 from the EHC 212 so that a natural flow of the fluid in the pipeline can be measured. In this regard, it should be understood that an electro-magnetic force is imposed on the micro-turbine when the EHC 212 is electrically coupled thereto. This electro-magnetic force effects the micro-turbines rotation despite the amount of fluid flowing therethrough. As such, the accuracy of the fluid flow measurement is varied (e.g., decreased) when the EHC 212 is harvesting energy from the fluid flow.

At least some of the hardware entities 214 perform actions involving access to and use of memory 220, which may be a Random Access Memory ("RAM") and/or any other suitable data storage device. Hardware entities 318 may also be configured for facilitating data communications. In this regard, the hardware entities 214 may include microprocessors, Application Specific Integrated Circuits ("ASICs") and other hardware.

The processing device 208 can access and run sensor applications installed on the sensor device $112_1$. At least one of the sensor applications is operative to perform data storage operations, data collection operations, data processing operations, and/or data communication operations.

The data storage operations of the processing device 208 can include, but are not limited to, the following operations: temporarily storing, in memory 220, data 222 representing the measured fluid flow. The data 222 is stored in memory 220 in accordance with any particular format. For example, the data 222 is stored in a table format.

The data collection operations of the processing device 208 can include, but are not limited to, the following operations: receiving information indicating the number of turns made by the micro-turbine detected by revolution counter 254 and/or a voltage level detected by voltage sensor 262; and/or processing the received information to generate binary data representing the amount of natural fluid flow as measured by the fluid flow sensor 202 and/or voltage sensor 262.

The data communication operations of the processing device 208 can include, but are not limited to, the following operations: wirelessly communicating data 222 to an external device (e.g., the SBCS 102 of FIG. 1); wireless communicating an identifier and/or timestamp generated by optional clock 206 to the external device; and/or receiving signals from the external device.

As shown in FIG. 2, the hardware entities 214 can include a computer-readable storage medium 280 on which is stored one or more sets of instructions 250 (e.g., software code) configured to implement one or more of the methodologies, procedures, or functions described herein. The instructions 250 can also reside, completely or at least partially, within the memory 220 and/or within the processing device 208 during execution thereof by the EHSD $112_1$. The memory 220 and the processing device 208 also can constitute machine-readable media. The term "machine-readable media", as used here, refers to a single medium or multiple media that store the one or more sets of instructions 250. The term "machine-readable media", as used here, also refers to any medium that is capable of storing, encoding or carrying a set of instructions 250 for execution by the EHSD $112_1$ and that cause the EHSD $112_1$ to perform any one or more of the methodologies of the present disclosure.

In some scenarios, the EHSD $112_1$ further comprises a Federated Power Management ("FPM") feature. The FPM feature is at least partially implemented by the processing device 208, switches 294 and/or voltage sensors 296. A more detailed discussion of illustrative hardware and/or software for facilitating the provision of the FPM feature is provided below in relation to FIGS. 4-7.

Illustrative Method for Operating a Fluid Supply System

Figure 3:
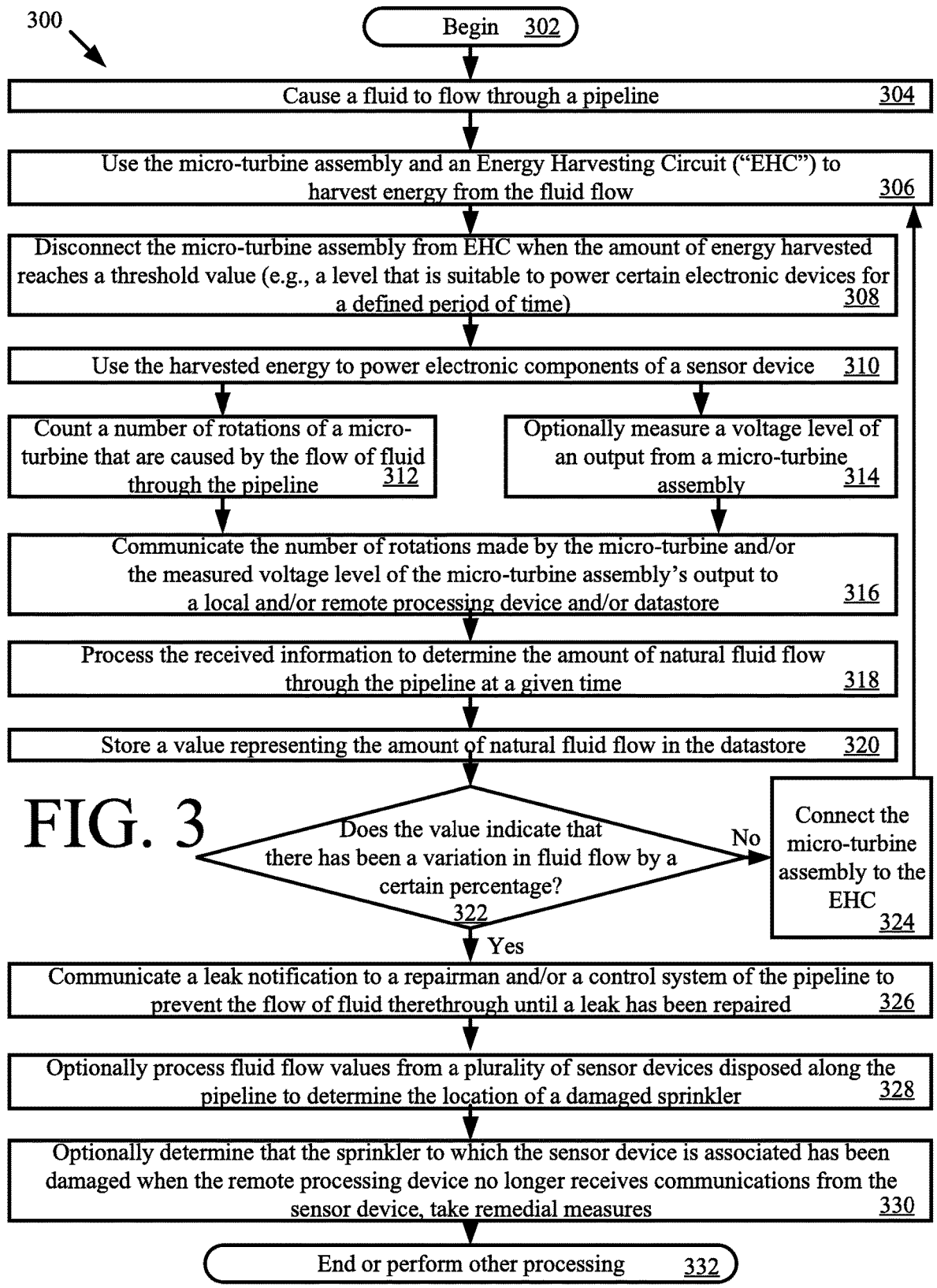
FIG. 3 is a flow diagram of an illustrative method for controlling an irrigation system.

Referring now to FIG. 3, there is provided a flow diagram of an illustrative method 300 for controlling an irrigation system (e.g., irrigation system 100 of FIG. 1). Method 300 begins with 302 and continues with 304 where a fluid (e.g., water) is caused to flow through a pipeline (e.g., pipeline $152_1$, $152_2$, . . . , or $152_n$ of FIG. 1). A micro-turbine assembly (e.g., micro-turbine assembly 252 of FIG. 2) and an EHC (e.g., EHC 212 of FIG. 2) are used in 306 to harvest energy from the fluid flow. In 308, the micro-turbine assembly is disconnected from the EHC when the amount of energy harvested reaches a threshold value. The disconnection can be achieved by changing a position of or activating a switch (e.g., switch 256 of FIG. 2) from a closed position to an open position. The switch position or device activation is controlled by a processing device (e.g., processing device 208 of FIG. 2) such as a microcontroller. The threshold value includes, but is not limited to, a level that is suitable to power certain electronic devices for a defined period of time. The harvested energy is used in 310 to power the electronic devices (e.g., electronic components 206, 208, 214, 216 and/or 220 of FIG. 2) of a sensor device (e.g., EHSD $112_1$, $112_2$, . . . , or $112_5$ of FIG. 1).

Next, operations are performed in 312-318 by the sensor device to determine an amount of natural fluid flow through the pipeline. These operations involve: counting a number of rotations of a micro-turbine that are caused by the flow of fluid through the pipeline (e.g., by a revolution counter 254 of FIG. 2); and/or measuring a voltage level of an output from the micro-turbine assembly (e.g., by a voltage sensor 262 of FIG. 2). The present solution is not limited to the particulars of 314. Alternatively or additionally, the number of spikes can be used to count revolutions. This information is then communicated to a local processing device (e.g., processing device 208 of FIG. 2) and/or a remote processing device (e.g., a processor 190 of SBCS 102 shown in FIG. 1B or a remote server). The received information is processed to determine a value representing the amount of natural fluid flow through the pipeline. The value is then stored in a datastore (e.g., datastore 220 of FIG. 2, datastore 192 of FIG. 1B, or a remote database).

In 322, a decision is made as to whether or not the value indicates that there has been a variation (e.g., a decrease) in fluid flow through the pipeline by a certain percentage (e.g., >5%) during a given period of time or from a reference fluid flow value. If not [322:NO], then 324 is performed where the micro-turbine assembly is re-connected to the EHC and method 300 returns to 306 so that a next iteration of the above described process is performed.

If the value does indicate that there has been a variation (e.g., decrease) in fluid flow through the pipeline by a certain percentage [322:YES], then a leak notification is sent to a repairman and/or a control system (e.g., SBCS 102 shown in FIG. 1B) of the pipeline to prevent the flow of fluid therethrough until the leak has been repaired, as shown by 326. The position of the leak along the pipeline can optionally be determined in 328. This determination is made using natural fluid flow values for a plurality of sprinklers (e.g., sprinklers $116_1$, $116_2$, . . . , $116_n$, $118_1$, $118_2$, . . . , $118_x$, $120_1$, $120_2$, . . . , or $120_y$ of FIG. 1A). For example, in some scenarios, this determination is made through a time series analysis of fluid flows across the irrigation system to detect whether a fluid flow pattern is the same as or different than a known base fluid flow pattern. The present solution is not limited to the particulars of this example.

In some scenarios, the antenna (e.g., antenna 218 of FIG. 2) of the sensor device is disposed in or integrated with a sprinkler. Damage to the sprinkler can be detected based on the communications ability of the antenna. For example, if a remote device (e.g., SBCS 102 shown in FIG. 1B or a remote device) has not received a communication sent from the sensor device for a defined period of time, then the sprinkler associated with the sensor device is deemed damaged. Remedial measures can then be taken to repair or replace the sprinkler, as shown by 330. The remedial measures can include, but are not limited to, communicating a notification to a repairmen or otherwise causing a repairman to be dispatched to the sprinkler's location. Upon completing 326, 328 or 330, 332 is performed where method 300 ends or other processing is performed (return to 306).

Illustrative Federated Power Management Component

As noted above, the present solution concerns FPM. The FPM can be implemented in a fluid supply system such as irrigation system 100 described above. In this regard, it should be understood that three flow bursts of less than one second each, separated by approximately half of a second, all at modest flow rates, enable the irrigation system 100 to execute continuously at a sampling rate of 10 Hz for approximately 6 seconds. While this steady-state outcome is exciting (and perhaps surprising), it is the transition periods immediately before sufficient energy is available for execution, and immediately before insufficient energy is available that are especially interesting. Just prior to execution, the highest consuming components (e.g., a radio or transceiver) throttle the startup time of the lowest consuming components (e.g., a processor), introducing unnecessary startup delays for key functions (e.g., sensing). A similar scenario occurs just before the available energy is exhausted, where one high-consuming action (e.g., transmission) can prematurely limit the number of low-consuming actions (e.g. sensing) that may be executed. The root cause of these limitations is the architectural reliance on a single capacitor as the system's energy store. High-consuming components dictate the use of a large capacitor that will accommodate the associated load peaks. This, in turn, dictates a longer charge time before the capacitor's voltage is above the required operating threshold, affecting both high- and low-consuming components. Further, when the capacitor's voltage falls below the required operating threshold after a high-consuming operation completes, all components become inactive, despite there potentially being sufficient energy stored in the capacitor for low-consuming components to continue operation.

A federated energy storage architecture provides a novel solution to this challenge. In essence, the hardware system is disaggregated, with each component (or subsystem) powered by a dedicated, appropriately sized capacitor. Low-power harvesting circuitry prioritizes the charge path across the capacitor array, first charging the capacitors for low-consuming components, followed by the higher-consuming components, in turn. The micro-controller receives an edge signal indicating the state-of-charge for each capacitor, providing the software system with a binary view of component availability.

The present solution introduces fundamental hardware and software extensions to the federated energy storage architecture that are radically different from existing approaches, with potentially transformative impacts at the confluence of hardware and software systems. The present solution enables a new class of system that is inherently robust and adaptive in the presence of both dynamic load conditions and dynamic harvesting conditions—conditions that are anticipated to be pervasive in the emerging Internet of Things.

The present solution enables dynamic control of charge and discharge priorities via a microcontroller core, as well as real-valued inputs regarding each component's charge state. The present solution employs new Operating System ("OS") services for managing charge and discharge priorities, as well as for querying the current charge state of each component. The latter services expose service life information for each component based on the current state-of-charge (e.g., 3.25 radio transmissions available at the selected transmission power). The component service life is dynamically computed based on state-of-charge information. The present solution also provides real-valued accounting of available service activations.

The FPM architecture of the present solution begins with the federated storage concept, distributing energy storage across multiple capacitors, each sized to accommodate an individual component or subsystem. From this point of departure, the present solution implements fundamental extensions designed to improve system adaptability in the presence of dynamic load and harvesting conditions. First, the capacitor network is modified to accommodate multiple service offerings per component (e.g., multiple radio transmissions), extending beyond binary component availability. This is achieved by increasing the size of each capacitor and charging the capacitor at the native harvesting voltage, above the voltage required for the associated component. Each capacitor serves as the input stage to a regulator (e.g., a buck regulator) that down-regulates the voltage as appropriate for the associated component.

Control of the charge and discharge pathways are shifted from a fixed priority scheme to a dynamic priority scheme, with priority controlled by a processing device (e.g., a microcontroller). This is achieved by gating the pathways through dedicated General Purpose Input/Output ("GPIO") pins, allowing the processing device (e.g., processing device 208 of FIG. 2) to engage in prolonged harvesting to accommodate a transactional flash update or multi-message protocol sequence, as examples. Another aspect of the present solution is the potential for emergency bridging across capacitors to accommodate unanticipated energy needs during critical operations. The state-of-charge for each capacitor is made available to the processing device via a standard sense-resistor design. This requires additional pathway gating to the processing device's ADC inputs to achieve energy efficiency.

Designing power management services for traditional computing systems is challenging. In constrained energy environments, in the presence of energy harvesting, the challenges are amplified. In the present solution, where embedded developers have full control over the charge and discharge pathways, the challenges are amplified even further. One requirement for overcoming these challenges is to provide developers with intuitive interfaces for controlling the charge and discharge pathways. The more significant challenge, though, is in aiding developers to effectively program to dynamically-varying energy budgets. The motivating supposition for this component of the present solution is that the challenges inherently stem from difficulty in understanding and applying the relationships among capacitor voltage, state-of-charge, and service life. It is difficult, for example, for a developer to make effective decisions about when to begin a multi-message exchange based on a raw voltage reading. Developers would instead prefer to have direct access to the number of available messages, abstracting away details concerning voltage and state-of-charge. The most exciting of the OS services is an accounting service that provides on-demand access to the number of available service units associated with each component or subsystem. The service interface enables applications to query, for example, the number of available radio transmissions, or the available time that may be spent in a reception state. The interface also enables applications to register for event notifications when the number of available service units exceeds or falls below specified thresholds. This event service provides a new programming foundation for adapting to dynamically-varying energy reserves.

Transforming voltage readings from individual capacitors into corresponding service units for the associated components is itself a challenge. The transformations may be derived empirically through repeated experimentation, coupled with linear regression to define the relationships between voltage and service unit for each capacitor/component/service combination. Alternatively or additionally, the transformations are derived automatically at runtime through dynamic registration of service state and periodic sampling of capacitor voltage.

Figure 4:
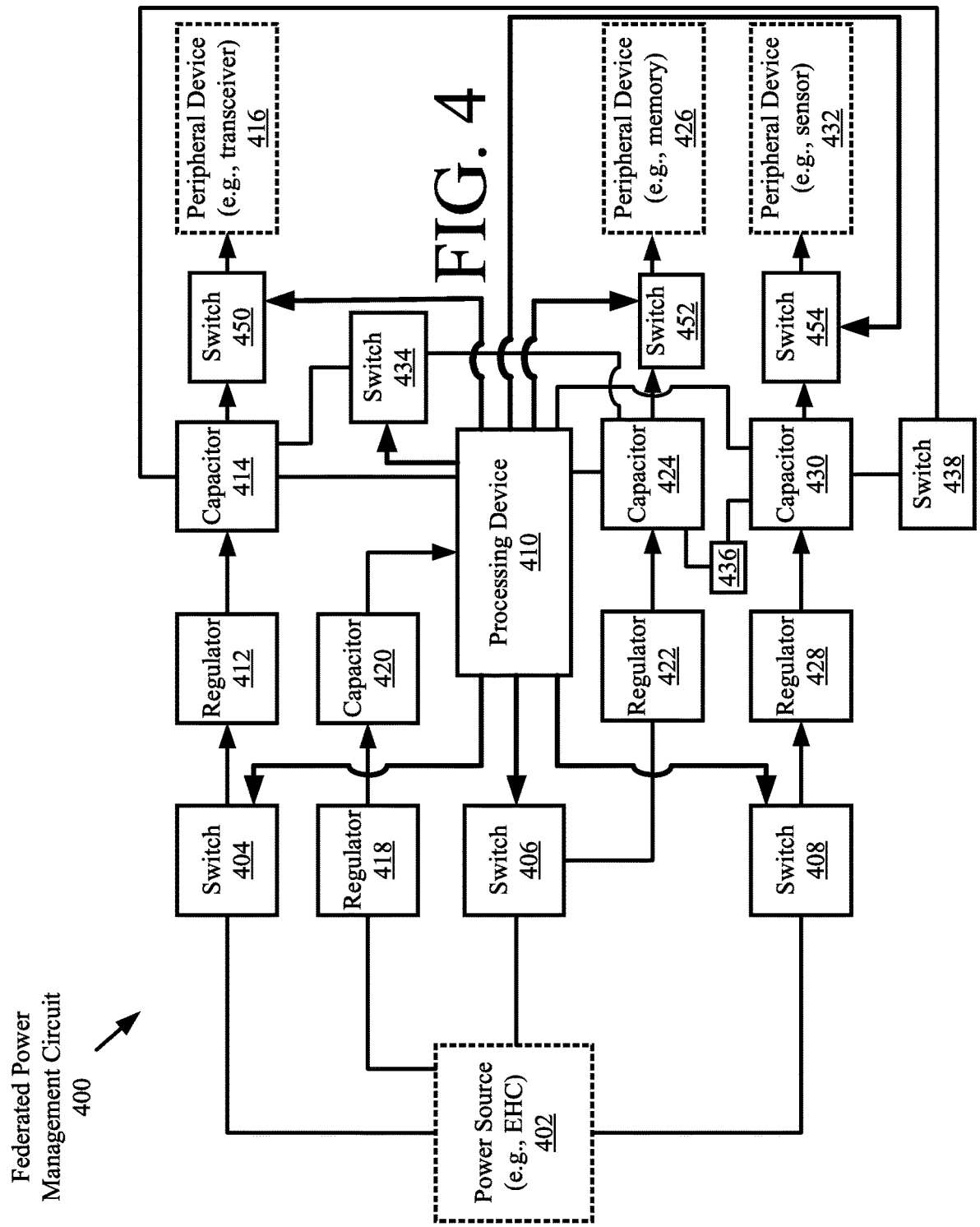
FIG. 4 is an illustration of an illustrative federated power management circuit.

Referring now to FIG. 4, there is provided an illustration of an illustrative FPM circuit 400. FPM circuit 400 comprises a plurality of switches 404, 406, 408, 434, 436, 438, 450, 452, 454, a plurality of regulators 412, 418, 422, 428, a plurality of capacitors 414, 420, 424, 430, and a processing device 410. The FPM circuit 400 can include more or less components than that shown in FIG. 4. However, the components shown are sufficient to disclose an illustrative embodiment implementing the present solution. Some or all of the components of the FPM circuit 400 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

Notably, the FPM circuit 400 can be implemented in each of the EHSDs $112_1, \ldots, 112_5$ of FIG. 1. In this case, the switches 404-408, 434-438, 450-454 include switches 294 of FIG. 2. The capacitors 414, 420, 424, 430 include the capacitors 290 of FIG. 2. The regulators include voltage regulators 268 of FIG. 2. The processing device 410 includes processing device 208 of FIG. 2. The present solution is not limited by the particulars of this implementation.

The processing device 410 is supplied power from the power source 402 via regulator 418 and capacitor 420. The power source 402 can include, but is not limited to, an energy harvesting circuit (e.g., EHC 212 of FIG. 2), a battery, and/or an AC mains via a DC regulator. The processing device 410 is generally configured to dynamically control the recharging of the other capacitors 414, 424, 430. It does this by manipulating regulators, not the capacitors. In this regard, the processing device 410 controls operation of the switches 404-408 for selectively and dynamically causing the recharging of capacitors 414, 424, 430 based on certain criteria (e.g., the role of each peripheral device (or electronic load device) in a system and/or each peripheral device's current and/or anticipated need for power).

Each capacitor 414, 424, 430 is respectively coupled to a respective peripheral device (or electronic load device) via a switch 450, 452, 454. For example, capacitor 414 is coupled to a peripheral device 416 (e.g., transceiver 216 of FIG. 2) via switch 450. Capacitor 424 is coupled to peripheral device 426 (e.g., memory 220 of FIG. 2) via switch 452. Capacitor 430 is coupled to peripheral device 432 (e.g., sensor 202 of FIG. 2 or ADC 258 of FIG. 2) via switch 454. Each capacitor is sized for the needs of the respective peripheral device. Each switch 450-454 is controlled by the processing device 410 for selectively and dynamically allowing or discontinuing the supply of power to the peripheral devices.

Notably, the peripheral devices are recharged in an order of importance at any given time with the processing device 410 receiving top priority. The order of importance and/or priorities of the peripheral devices 416, 426, 432 is(are) dynamically determined during operation of FPM circuit 400 so that the processing device 410 intelligently makes peripheral device recharging and discharging decisions in view of highly dynamic power supply conditions (e.g., energy harvesting conditions) and/or highly dynamic load conditions. The processing device 410 is in complete control of the recharging pathways and discharging pathways of FPM circuit 400. The recharging pathways include a first recharging pathway from the power source 402 to capacitor 414, a second recharging pathway from the power source 402 to capacitor 424, a third recharging pathway from the power source 402 to capacitor 430, and a first recharging pathway from the power source 402 to capacitor 420. The discharging pathways include a first discharging pathway from capacitor 414 to peripheral device 416, a second discharging pathway from capacitor 424 to peripheral device 426, a third discharging pathway from capacitor 430 to peripheral device 432, and a fourth discharging pathway from capacitor 420 to processing device 410.

For example, if the processing device 410 knows that there is enough power being supplied by the power source 402 (*a*) to perform its own operations or (b) to transmit a message from peripheral device 416, then the power is selectively used to achieve operation (a) first since the processing device 410 has a higher priority than the peripheral device 416. Operation (b) is performed second when additional power has been supplied by power source 402 that is sufficient for transmitting the message. After the message's transmission, the processing device 410 revaluates and/or changes the charging priorities associated with the peripheral devices. In this regard, the processing device 410 determines that operations of peripheral device 426 are needed to be performed next. As such, the processing device 410 causes the capacitor 424 to be charged prior to capacitors 414 and 430. The present solution is not limited to the particulars of this example.

The processing device 410 is configured to monitor the levels of charge for each capacitor 414, 424, 430. Accordingly, each capacitor 414, 424, 430 is also connected to the processing device 410. In the architecture shown in FIG. 4, the ability to detect the capacitors' charge levels is incorporated in the processing device 410. For example, the processing device 410 includes an ADC. Alternatively or additionally, this ability is implemented by sensors (not shown in FIG. 4) disposed between the processing device 410 and capacitors 414, 424, 430. For example, a voltage sensor (e.g., voltage sensor 296 of FIG. 2) or a Coulomb counter is disposed across the plates of each capacitor 414, 424, 430.

The detected charge levels of capacitors 414, 424, 430 are analyzed by the processing device 410 to determine the number of each type of operation (or the number of service activations) that can be respectively performed by the peripheral devices. The following TABLE 1 is useful for understanding this point.

TABLE 1

| Device | Operation | Number Of Service Activations That Can Be Performed In View Of Respective Capacitor's Level Of Charge |
|---|---|---|
| Peripheral Device 416 (e.g., transceiver) | Transmit | 2.75 messages or |
|  | Receive | 4.15 seconds |
| Peripheral Device 426 (e.g., memory) | Read | 10.5 reads or |
|  | Write | 2.15 writes |
| Peripheral Device 432 (e.g., sensor) | Measure | 15.2 measurements |

As shown by TABLE 1, the processing device 410 analyzes the current charge levels of capacitors 414, 424, 430 to transform voltage readings from individual capacitors into corresponding service units for the respective components. More specifically, the processing device 410 determines that there is enough power to: transmit 2.75 messages from peripheral device 416 or receive 4.15 seconds of information at peripheral device 416; perform 10.5 reads by peripheral device 426 or perform 2.15 writes by peripheral device 426; and take 15.2 measurements (e.g., voltage measurements) by peripheral device 432. The information contained in TABLE 1 is then used by the processing device 410 to prioritize the recharging of the capacitors 414, 424, 430.

Notably, the information of TABLE 1 is variable, i.e., it changes over time as a result of the performance of operations by the peripheral devices and the capacitors' charging/discharging. For example, peripheral device 432 performs one sensing operation. As a result, capacitor 430 is at least partially discharged. The processing device 410 detects the change in the capacitor's level of charge and modifies the contents of TABLE 1 accordingly. A modified TABLE 2 is shown below in which the value in the third column for peripheral device 432 has been reduced to reflect that there is now enough charge in capacitor 430 for performing 14.2 measurements instead of 15.2 measurements.

TABLE 2

| Device | Operation | Number Of Service Activations That Can Be Performed In View Of Respective Capacitor's Level Of Charge |
|---|---|---|
| Peripheral Device 416 (e.g., transceiver) | Transmit | 2.75 messages or |
|  | Receive | 4.15 seconds |
| Peripheral Device 426 (e.g., memory) | Read | 10.5 reads or |
|  | Write | 2.15 writes |
| Peripheral Device 432 (e.g., sensor) | Measure | 14.2 measurements |

As a consequence of this change, the recharging priorities of the capacitors are also modified, i.e., the capacitor recharging priorities are dynamically changed over time by the processing device 410. Notably, the present solution is not limited to the particulars of TABLE 1 and TABLE 2.

In some scenarios, the processing device 410 is configured to transform voltage readings from individual capacitors into corresponding service units for the respective components. This transformation is achieved by mapping capacitor charge levels to the number of service activations associated with each peripheral device. The mapping is dynamic and changes over time. The mapping function can be implemented as an OS service using pre-specified mapping data and/or learned mapping data (e.g., mapping data learned via a machine intelligence algorithm). The present solution is not limited to the above described transformation techniques. Other transformation techniques can be used herein. For example, one or more mathematical algorithms can be employed to convert a capacitor voltage level into a number of service units for a respective electronic component.

In those or other scenarios, the FPM circuit 400 further comprises additional switches 434, 436, 438 that are normally in open positions. These switches can also be controlled by the processing device 410 for selectively recharging the capacitors via the supply of power from each other. For example, switch 434 can be operated to cause a closed circuit to be created between capacitor 414 and capacitor 424. In this case, capacitor 414 is recharged by capacitor 424, or vice versa. Similarly, switch 436 can be operated to cause a closed circuit to be created between capacitor 424 and capacitor 430. In this case, capacitor 424 is recharged by capacitor 430, or vice versa. Likewise, switch 438 can be operated to cause a closed circuit to be created between capacitor 414 and capacitor 430. In this case, capacitor 414 is recharged by capacitor 430, or vice versa.

Figure 5:
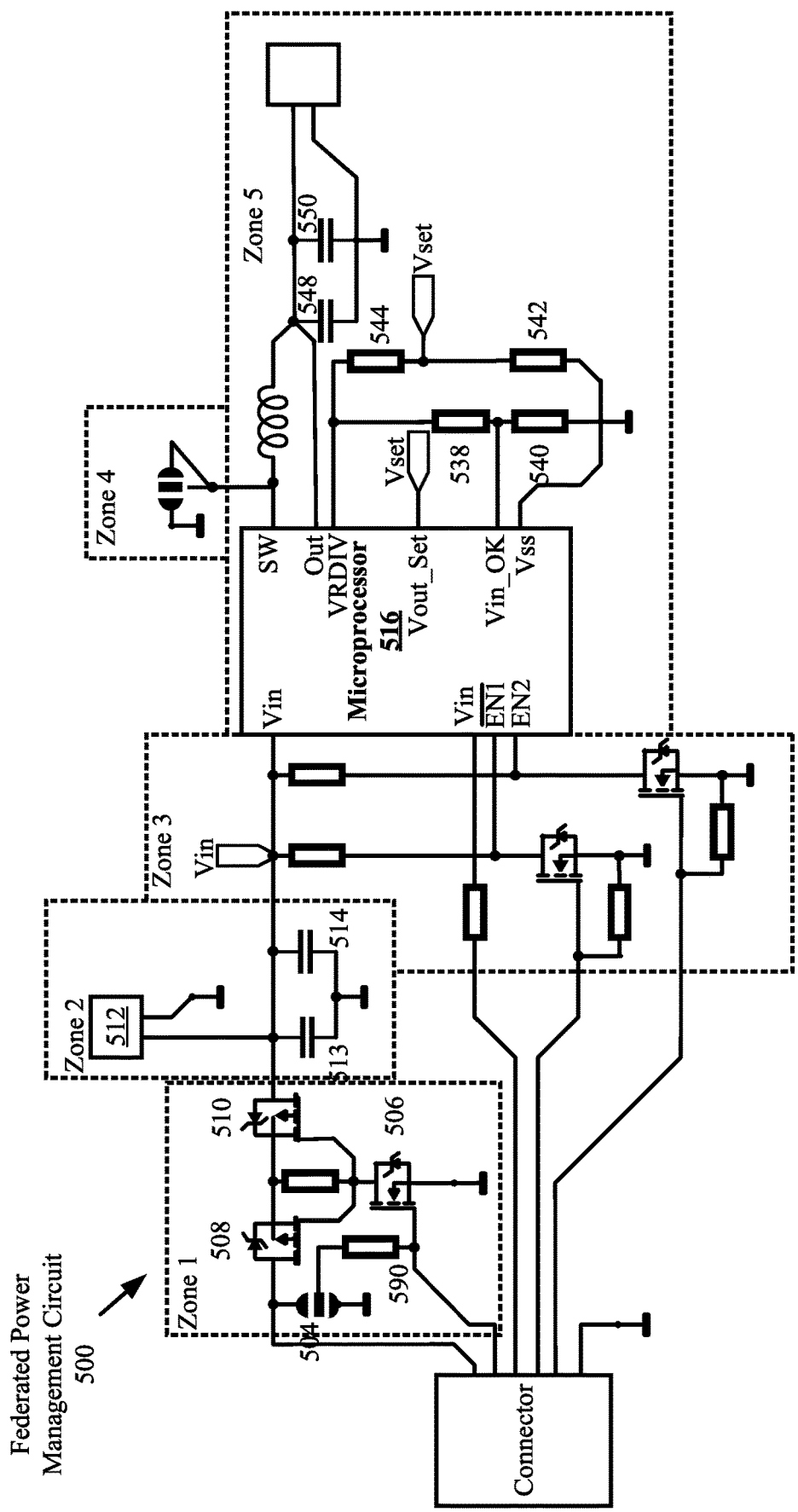
FIG. 5 is an illustration of an illustrative circuit configured to provide federated power management.

FIG. 5 is an illustration of an illustrative circuit 500 configured to provide federated power management. Circuit 500 comprises a peripheral board. The peripheral board is used to store harvested energy, report available energy to an off-board microcontroller, and regulate power to the peripheral. The peripheral board is split into five zones.

Notably, the circuit shown in FIG. 5 is designed such that charging via an energy harvester is always performed. This may be desirable when the peripheral device is a microcontroller or other processing element. In some scenarios, it may be desirable to have the charging disabled by default (e.g., to prioritize charging of a processing element). In this case, electronic components 504 and 590 would be eliminated from circuit 500.

Zone 1 controls the charging pathway to a storage capacitor, allowing current to flow into the capacitor, but not discharge back into the harvesting source. This is realized using semiconductor switches 506, 508, 510 in a load switch configuration. The default state of the load switch configuration (charge enable, charge disable) is set using jumper 504. The microcontroller's charging pathway is on by default, whereas peripheral pathways are off by default. This jumper allows this selection.

Zone 2 is the bulk storage for the regulator. Socket 512 is used to connect capacitors 513, 514 for larger loads (or longer run times).

Zone 3 provides level shifted control of the regulator enable pins. The enable pins for the regulator have active levels close to the input voltage Vin. This can present obstacles for low-power microcontrollers. Zone 3 passes the control signals through a common emitter amplifier, allowing any microcontroller 516 with I/O pins at or above 1.8 volts to enable the regulator.

Zone 4 is used for diagnostic purposes.

Zone 5 provides the regulation circuitry based on a buck switching regulator. The voltage regulator limits both voltage and current. The output voltage is set using resistors 542, 544. The under-voltage lockout threshold is set by resistors 538, 540. The buck switching regulator provides Vin feedback to the microcontroller 516 using the Vin_OK pin. This provides a quasi-digital signal to the microcontroller 516 with its Vmax being Vin, and turning off when Vin falls below a set threshold. This allows the microcontroller 516 to sense the storage capacitor's 548, 550 voltage via a high resistance voltage divider 538-544. An improvement to this circuit could be the addition of a FET to the voltage divider. This would allow a full disconnect of the voltage divider from the capacitor, allowing longer run times.

Figure 6:
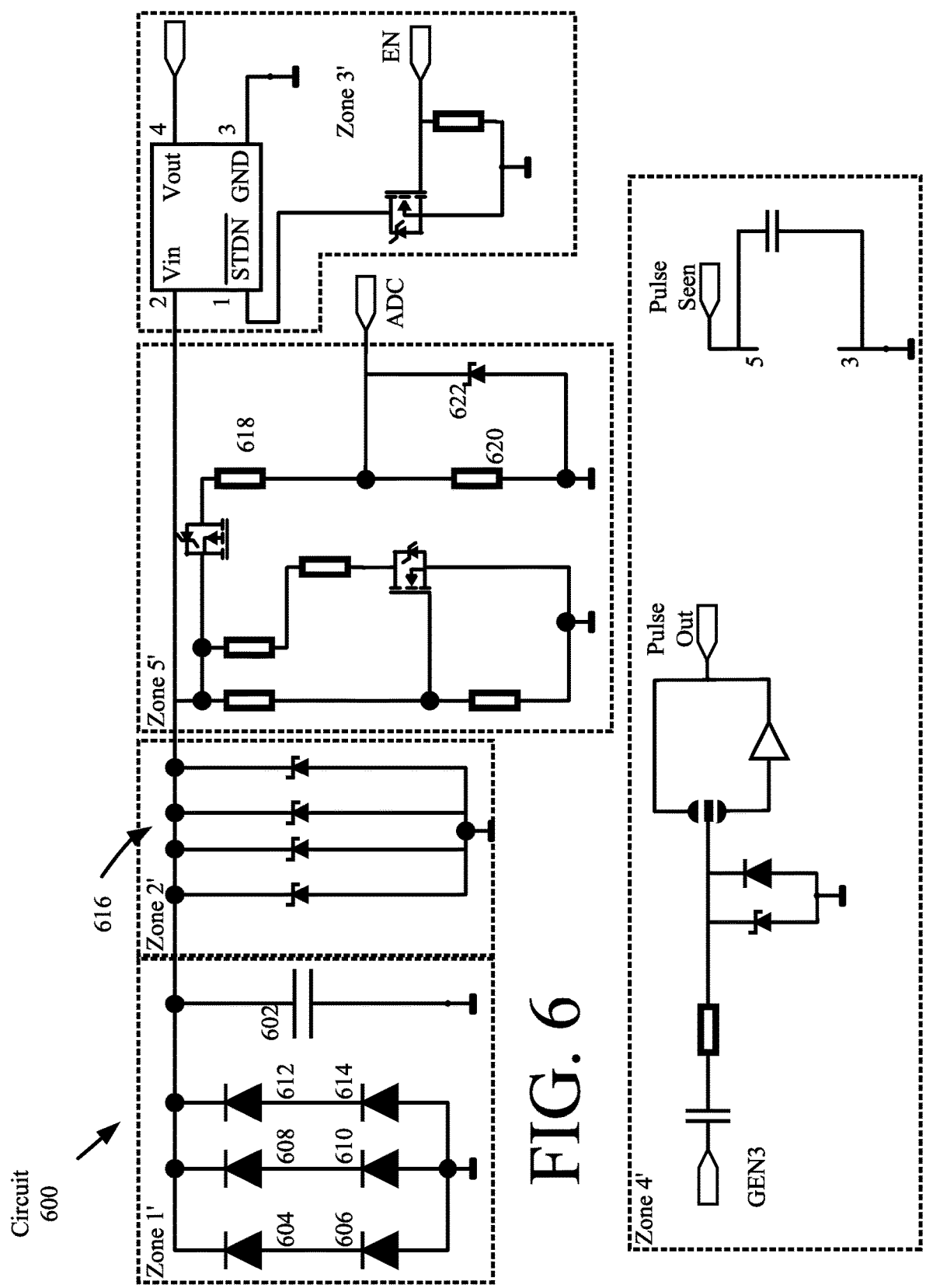
FIG. 6 is an illustration of another illustrative circuit configured to provide federated power management.

FIG. 6 is an illustration of an illustrative circuit 600 of a power conditioning board. This board is specific to a sprinkler irrigation system. It is designed to support energy harvesting, provide a "power good" indicator to an off-board microcontroller, and provide a reliable pulse used to count turbine revolutions. Components associated with the latter feature also support unloading of the turbine to achieve enhanced sensing accuracy.

The power input board is split into 5 zones. Zone 1' comprises a three-phase diode rectifier 504-514 for a generator. This takes the 3 phase AC power produced by the generator and converts it into rectified DC power. A capacitor 502 takes the rectified DC power and filters it for later regulation.

Zone 2' contains power zener diodes 516 used to shunt the available DC voltage and limit it to N volts (e.g., 32 Volts). This prevents damage to other components due to the high voltage produced by the generator.

Zone 3' comprises a voltage regulation circuit, providing a given DC voltage (e.g., 5V DC). This is accomplished using a step down (buck) switching regulator. The regulator can be disabled by sending a high signal to the enable line to unload the generator for better sensing accuracy.

Zone 4' is the rotation detector used to detect turbine rotations. This is done passively using discrete components, a low power Schmitt trigger, and a zener diode. This eliminates the need for the magnetic encoder used in a previous design. When the generator spins at a high enough RPM, the AC voltage becomes large enough to activate the Schmitt trigger, and the resulting pulse is passed to the microcontroller 516. Pulse count per minute can then be used for revolution counting.

Zone 5' is the "power good" detector. This circuit is activated at 15 volts and provides a quasi-digital output to the microcontroller 516. At voltage levels below 47 volts, the output is ⅟₁₀ of the generator's rectifier output voltage. This can be reduced for lower voltage microcontrollers by increasing the ratio further and using a lower voltage rated zener diode for protection 618-622. This circuit could be improved in 2 ways. The first is by adding a semiconductor switch between Zone 1' and Zone 2', controlled by a shutdown enable line of Zone 3'. This would allow for a full disconnect of the generator, and therefore provide less error to the rotation detector. The second would be to use a diode instead of a capacitor in the rotation detector. This would prevent the output line of the detector from going negative in voltage when the generator line goes negative.

Figure 7:
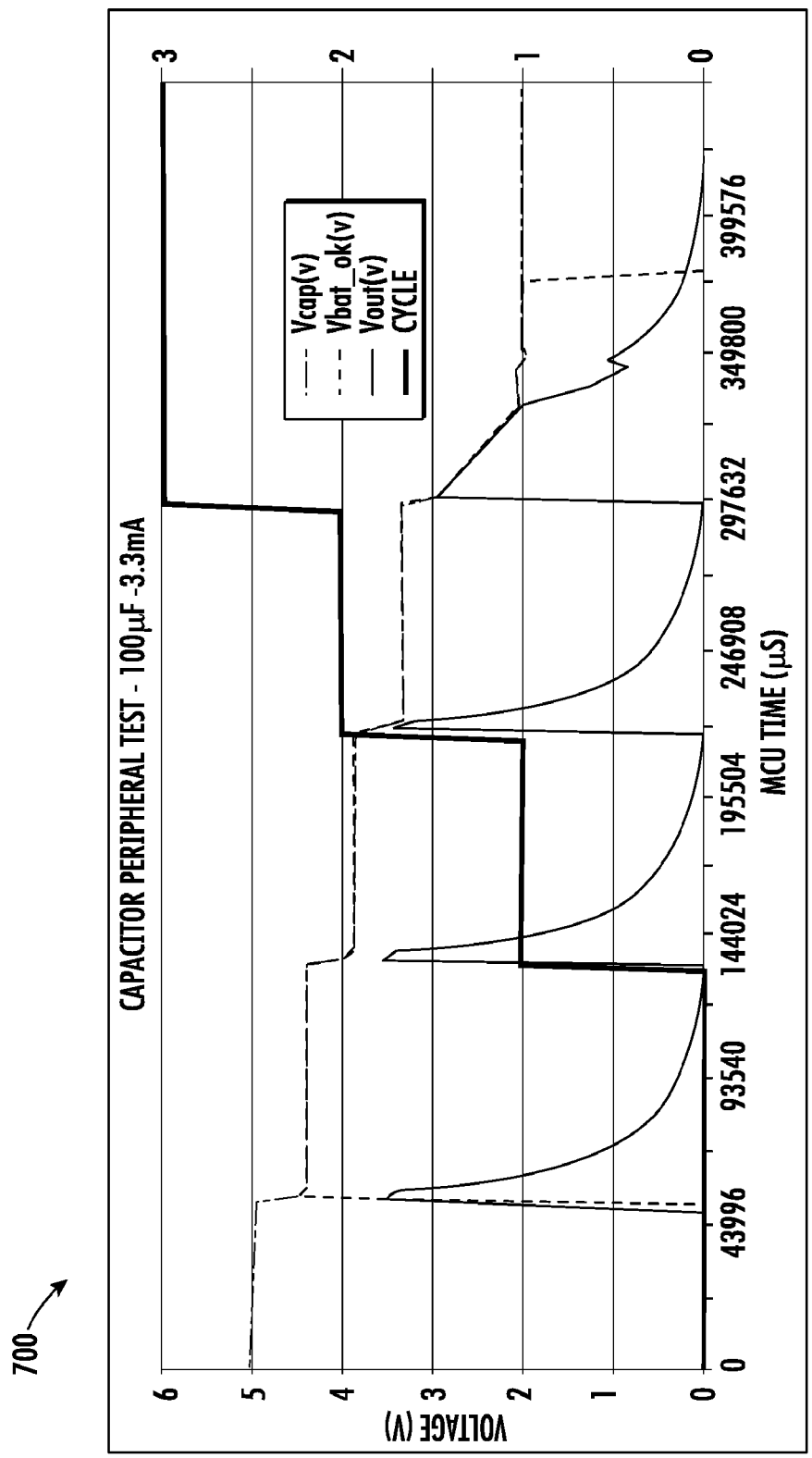
FIG. 7 is a graph showing illustrative test results.

FIG. 7 is a graph 700 showing test results.

Illustrative Method for Providing Federated Power Management

Figure 8A:
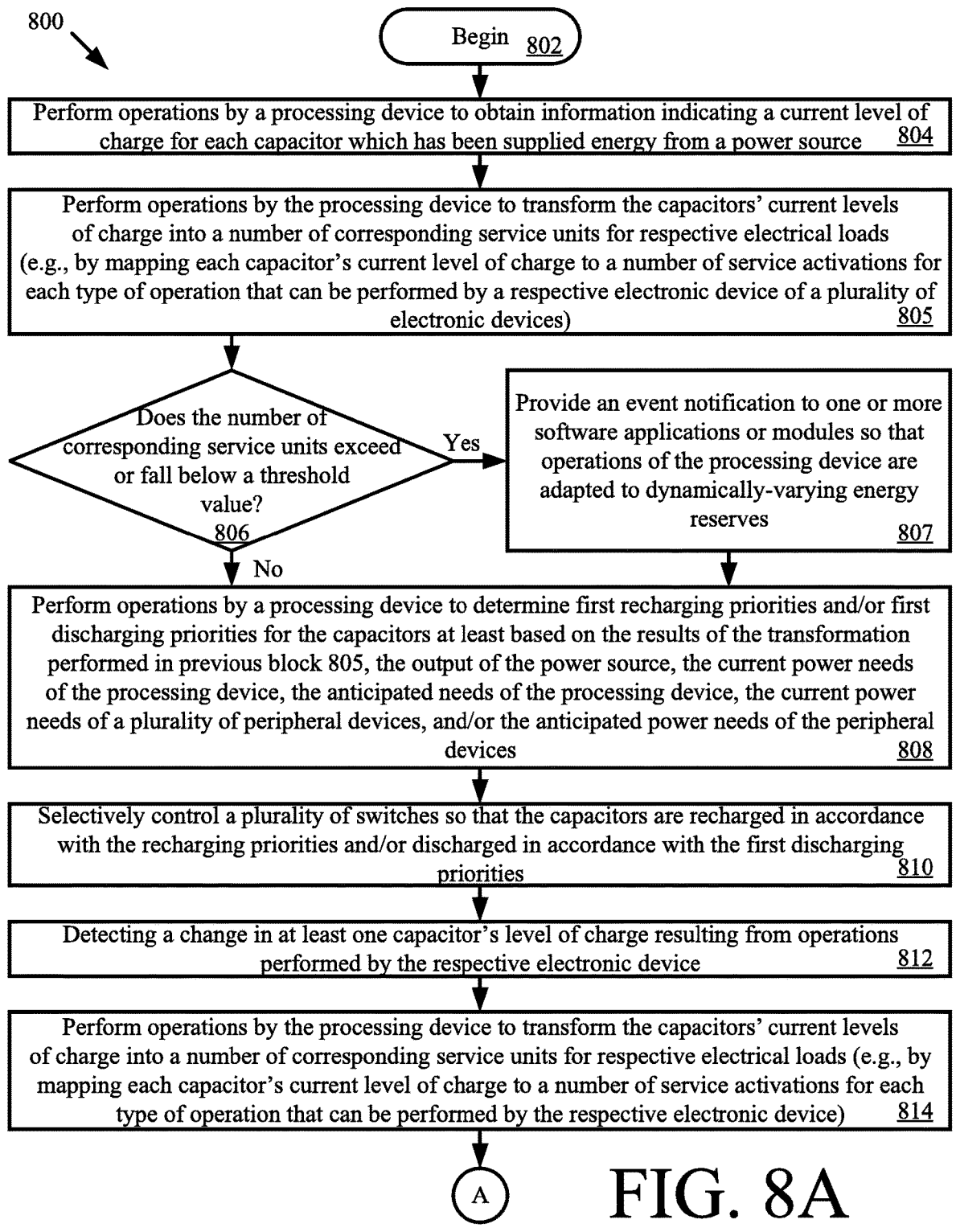

FIGS. 8A-8B provide a flow diagram of an illustrative method 800 for providing federated power management. Method 800 can be implemented at least partially by system 100 of FIG. 1, EHSD 112₁ of FIG. 2, FPM circuit 400 of FIG. 4, and/or other devices.

As shown in FIG. 8A, method 800 begins with 802 and continues with 804 where a processing device (e.g., processing device 208 of FIG. 2 or 410 of FIG. 4) obtains information indicating a current level of charge for each of a plurality of capacitors (e.g., capacitors 290 of FIG. 2 or capacitors 414, 420, 424, 430 of FIG. 4). This information can include values specifying sensed voltages across each capacitor's plates. The capacitors have been supplied energy from a power source (e.g., EHC 212 of FIG. 2 or power source 402 of FIG. 4). The present solution is not limited to scenarios in which capacitors are used as the energy storage elements. The capacitors can be replaced with any known or to be known energy storage element selected in accordance with a particular application.

In 805, the processing device transforms the capacitors' current levels of charge into a number of corresponding service units for respective electronic loads (e.g., a processor, a memory, a sensor, and/or a transceiver). This transformation can be achieved by mapping each capacitor's current level of charge (or sensed voltage level across the capacitor's plates) to a number of service activations for each type of operation that can be performed by a respective electronic device of a plurality of electronic devices (e.g., processing device 208 of FIG. 2 or 410 of FIG. 4, transceiver 216 of FIG. 2, ADC 258 of FIG. 2, voltage sensor 262 of FIG. 2, memory 220 of FIG. 2, fluid flow sensor 202 of FIG. 2, and/or peripheral devices 416, 426, 432 of FIG. 4). For example, the processing device maps: a first capacitor's current level to charge to the number of transmissions and the number of receptions that can be performed by a transceiver; a second capacitor's level of charge to the number of reads and the number of writes that can be performed by a memory; and a third capacitor's current level of charge to a number of measurements that can be performed by a sensor. The present solution is not limited to the particulars of this example. The transformation can be achieved in accordance with a pre-specified set of rules, a defined algorithm, and/or a machine learning algorithm. A table, matrix or other data structure can be used to associate capacitor charge levels (or sensed voltage level across the capacitor's plates) to a number of service units, as described above.

Upon completing 805, a decision is made in 806 as to whether or not the number of corresponding service units exceeds or falls below a threshold value. The threshold value can comprise an integer or a decimal. It should be understood that this step applies per capacitor. If the number of corresponding service units exceeds or falls below the threshold value [806:YES], then 807 is performed. In 807, an event notification is provided to one or more software applications or modules so that operations of the processing device are adapted to dynamically-varying energy reserves. Upon completing 807, method 800 continues with 808 which is discussed below.

In contrast, if the number of corresponding service units does not exceed or fall below the threshold value [806:NO], then 808 is performed. In 808, the processing device performs operations to determine at least one of first recharging priorities and/or first discharging priorities for the capacitors at least based on the results of the transformation (e.g., determined using a mapping based process), the current output of the power source, the anticipated output of the power source (e.g., determined based on the amount of energy available from an energy source and a learned/tracked pattern of power source output and energy source/surrounding environment conditions), the current power needs of the processing device, the anticipated needs of the processing device, the current power needs of the loads (e.g., peripheral devices), and/or the anticipated power needs of the loads (e.g., peripheral devices). The processing device then selectively controls a plurality of switches (e.g., switches 294 of FIG. 2 or switches 404, 406, 408, 434, 436, 438 of FIG. 4) so that the capacitors are recharged in accordance with the first recharging priorities and/or discharged in accordance with the first discharging priorities, as shown by 810. Techniques for controlling switches are well known in the art, and therefore will not be described herein. Any known or to be known technique for controlling a switch can be used herein without limitation. Each of the switches can include, but is not limited to, an electronic switch (e.g., a transistor), an electromechanical switch, or a mechanical switch.

At some later time, the processing device detects a change in at least one capacitor's level of charge, as shown by 812. This change may be a consequence of the capacitor's discharge resulting from operations performed by the respective electronic device. This change can be detected using a plurality of sensed voltage levels across the capacitor's plates. For example, the processing device can compare two sensed voltage levels to each other to determine if there is a difference therebetween indicating a decrease in value over time.

Next in 814, the processing device once again transforms the capacitors' current levels of charge into corresponding service units for respective electronic loads (e.g., a processor, a memory, a sensor, and/or a transceiver). In some scenarios, this transformation is achieved by mapping each capacitor's current level of charge (or sensed voltage level across the capacitor's plates) to a number of service activations for each type of operation that can be performed by the respective electronic device. The transformation can additionally or alternatively be achieved in accordance with a pre-specified set of rules, a defined algorithm, and/or a machine learning algorithm. A table, matrix or other data structure can be used to associate capacitor charge levels (or current sensed voltage level across the capacitor's plates) to a number of service units, as described above.

Upon completing 814, method 800 continues with 815 of FIG. 8B where a decision is made as to whether or not the number of corresponding service units exceeds or falls below a threshold value. The threshold value can comprise an integer or a decimal. If the number of corresponding service units exceeds or falls below the threshold value [815:YES], then 816 is performed. In 816, an event notification is provided to one or more software applications or modules so that operations of the processing device are adapted to dynamically-varying energy reserves. Upon completing 816, method 800 continues with 817 which is discussed below.

In contrast, if the number of corresponding service units does not exceed or fall below the threshold value [815:NO], then 817 is performed. In 817, the results of this transformation are used by the processing device to determine second different recharging priorities for the capacitors and/or second different discharging priorities for the capacitors. This determination can be additionally or alternatively made based on the output of the power source, the current power needs of the processing device, the anticipated needs of the processing device, the current power needs of the loads (e.g., peripheral devices), and/or the anticipated power needs of the loads (e.g., peripheral devices). In 818, the processing device controls the switches so that the capacitors are recharged in accordance with the second different recharging priorities and/or discharged in accordance with the second different discharging priorities. Subsequently, 820 is performed where method 800 ends or other processing is performed (e.g., method 800 returns to 804).

In some scenarios, an Application Programming Interface ("API") is provided that facilitates the communication of information from the processing device and/or at least one peripheral device to another local or remote device and/or software application, and/or vice versa. This information can include, but is not limited to, a number of service activations for at least one operation that can be performed by a respective device. A programmer can use this information to manage the life of the device so that power is continuously provided to the device throughout operations of the device.

All of the apparatus, methods, and algorithms disclosed and claimed herein can be made and executed without undue experimentation in light of the present disclosure. While the present solution has been described in terms of preferred embodiments, it will be apparent to those having ordinary skill in the art that variations may be applied to the apparatus, methods and sequence of steps of the method without departing from the concept, spirit and scope of the present solution. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the present solution as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method of providing federated power management in an electronic circuit, comprising:

performing first operations by a processing device to obtain information indicating a current level of charge for each capacitor of a plurality of capacitors which have been supplied energy from a power source, where each said capacitor is configured to supply power to a respective electronic load device of a plurality of electronic load devices that is configured to perform at least one type of load device operation;

transforming, by the processing device, each said capacitor's current level of charge into a number of service units representative of a duration or a number of times that the at least one type of load device operation can be performed by the respective electronic load device with said current level of charge of said capacitor of the plurality of capacitors;

determining, by the processing device, at least one of recharging priorities for the plurality of capacitors and discharging priorities for the plurality of capacitors at least based on the numbers of service units; and performing second operations by the processing device to cause the plurality of capacitors to be selectively connected to the power source to facilitate recharging in accordance with the recharging priorities or to be selectively connected with the plurality of electronic load devices to facilitate discharging in accordance with the discharging priorities.

2. The method according to claim 1, wherein the second operations comprise selectively controlling a plurality of switches respectively connected between the power source and the plurality of capacitors.

3. The method according to claim 2, wherein voltage regulators reside respectively between the plurality of switches and the plurality of capacitors.

4. The method according to claim 1, wherein the second operations comprise selectively controlling a plurality of switches respectively connected between the plurality of capacitors and the plurality of electronic load devices.

5. The method according to claim 1, wherein the second operations comprise selectively controlling a plurality of switches respectively connected between at least two capacitors of the plurality of capacitors.

6. The method according to claim 1, wherein the information comprises values specifying sensed voltage levels across plates of the plurality of capacitors.

7. The method according to claim 1, wherein the power source is an Energy Harvesting Circuit ("EHC").

8. The method according to claim 1, wherein the number of service units comprises a number of available transmissions, an amount of available time that can be spent in a reception state, a number of memory reads, a number of memory writes, or a number of measurements that can be taken by a sensing device.

9. An electronic circuit, comprising:
a plurality of capacitors; and
a processing device configured to perform federated power management by:
obtaining information indicating a current level of charge for each capacitor of the plurality of capacitors, each said capacitor configured to supply power to a respective electronic load device of a plurality of electronic load devices that is configured to perform at least one type of load device operation;
transforming each said capacitor's current level of charge into a number of service units representative of a duration or a number of times that the at least one type of load device operation can be performed by the respective electronic load device with said current level of charge of said capacitor of the plurality of capacitors;
determining at least one of recharging priorities for the plurality of capacitors and discharging priorities for the plurality of capacitors at least based on the numbers of service unit; and
performing control operations to cause the plurality of capacitors to be selectively connected to a power source to facilitate recharging in accordance with the recharging priorities or to be selectively connected with the plurality of electronic load devices to facilitate discharging in accordance with the discharging priorities.

10. The electronic circuit according to claim 9, wherein the control operations comprise selectively controlling a plurality of switches respectively connected between the power source and the plurality of capacitors.

11. The electronic circuit according to claim 10, wherein the power source is an Energy Harvesting Circuit ("EHC").

12. The electronic circuit according to claim 10, wherein voltage regulators reside respectively between the plurality of switches and the plurality of capacitors.

13. The electronic circuit according to claim 9, wherein the control operations comprise selectively controlling a plurality of switches respectively connected between the plurality of capacitors and the plurality of electronic load devices.

14. The electronic circuit according to claim 9, wherein the second operations comprise selectively controlling a plurality of switches respectively connected between at least two capacitors of the plurality of capacitors.

15. The electronic circuit according to claim 9, wherein the information comprises values specifying sensed voltage levels across plates of the plurality of capacitors.

16. The electronic circuit according to claim 9, wherein the number of service units comprises a number of available transmissions, an amount of available time that can be spent in a reception state, a number of memory reads, a number of memory writes, or a number of measurements that can be taken by a sensing device.

* * * * *